United States Patent [19]
Putzolu et al.

[11] Patent Number: 5,832,203
[45] Date of Patent: Nov. 3, 1998

[54] METHOD FOR PROVIDING RECOVERY FROM A FAILURE IN A SYSTEM UTILIZING DISTRIBUTED AUDIT

[75] Inventors: Franco Putzolu, San Francisco; Steven R. Pearson, Campbell; James M. Lyon, San Jose; Malcolm Mosher, Jr., Los Gatos, all of Calif.

[73] Assignee: Tandem Computers Incorporated, San Jose, Calif.

[21] Appl. No.: 377,381

[22] Filed: Jan. 23, 1995

[51] Int. Cl.[6] .................................................. G06F 11/00
[52] U.S. Cl. .............................. 395/182.18; 395/182.17; 395/182.14
[58] Field of Search ..................... 395/182.18, 182.13, 395/182.14, 182.17, 600, 182.11

[56]  References Cited

U.S. PATENT DOCUMENTS

| 4,878,167 | 10/1989 | Kapulka et al. | 364/200 |
| 5,278,982 | 1/1994 | Daniels et al. | 395/600 |
| 5,287,501 | 2/1994 | Lomet | 395/600 |
| 5,333,303 | 7/1994 | Mohan | 364/DIG. 1 |
| 5,485,608 | 1/1996 | Lomet et al. | 395/182.18 |
| 5,499,367 | 3/1996 | Bamford et al. | 395/600 |
| 5,524,205 | 6/1996 | Lomet et al. | 395/182.14 |
| 5,561,795 | 10/1996 | Sarkar | 395/600 |

OTHER PUBLICATIONS

"ARIES: A Transaction Recovery Method Supporting Fine–Granularity Locking and Partial Rollbacks Using Write–Ahead Logging," C. Mohan et al., *Computer Science*, Jan. 23, 1998.

*Primary Examiner*—Joseph Palys
*Attorney, Agent, or Firm*—Townsend and Townsend and Crew LLP

[57] ABSTRACT

An improved recovery method utilizes sequence numbers to order log records and reduce the excess compensating actions due to a failure during recovery. Next undo records are written to the log after a preset number of compensating actions which include the sequence number of the record currently being scanned. After a failure, all records between the next undo record and the record having the sequence number included in the next undo record are ignored during when the log is scanned backwards.

1 Claim, 4 Drawing Sheets

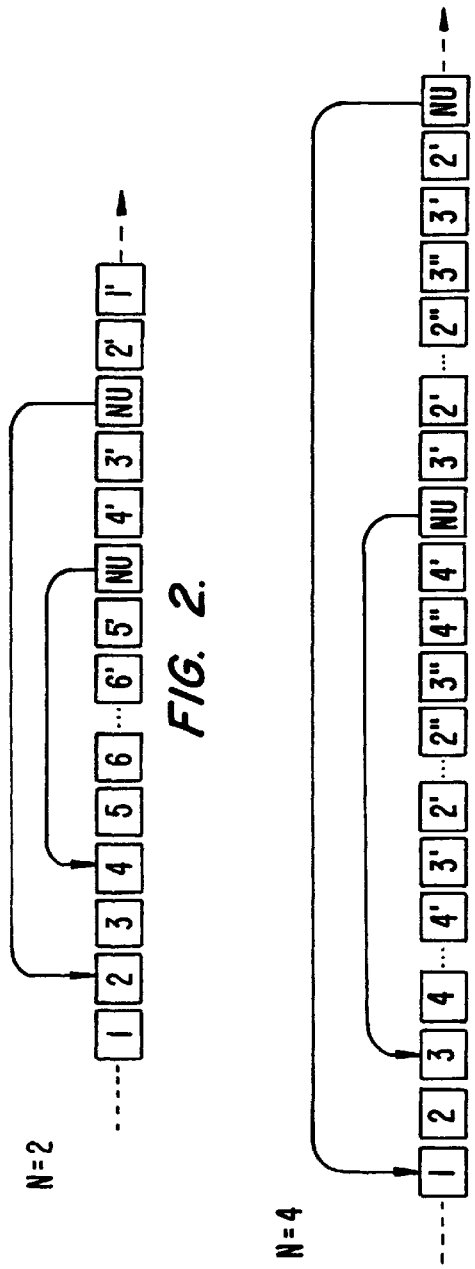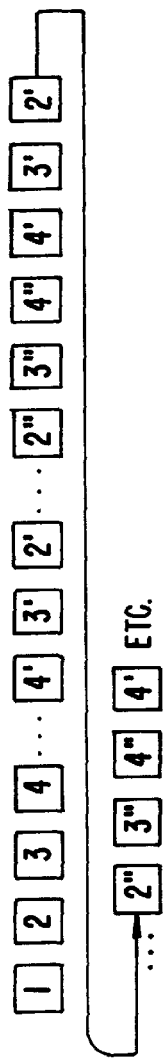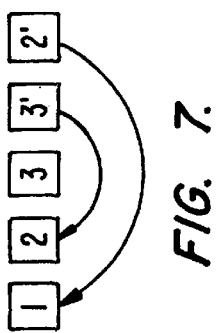

METHOD FOR PROVIDING RECOVERY FROM A FAILURE IN A SYSTEM UTILIZING DISTRIBUTED AUDIT

BACKGROUND OF THE INVENTION

Transaction and database (or "resource") managers cooperate to provide database recovery methods. These methods undo the effects of transactions that abort, ensure that the database is consistent during system or resource manager restarts, and provide recovery from other events, such as media failures.

Several different approaches to this recovery exist. The most common approaches use a log or audit trail which records the changes that transactions make to the database. The recovery methods normally read the log and use the history recorded therein to perform the redo and undo operations necessary to put the database into the correct state.

Many systems use database recovery methods which perform "physical" (or "page-oriented") redo operations and "logical" (or "record-oriented") undo operations. This approach requires that undo operations themselves generate audit records (typically referred to as "compensating log records" or "CLRs") that are recorded in the log. The details and benefits of this approach are describe in an article by Mohan et al. entitled *ARIES: A Transaction Recovery Method Supporting Fine-Granularity Locking and Partial Rollbacks Using Write-Ahead Logging*, IBM Research Report RJ6649, San Jose, Calif., 1989.

One result of generating CLRs during undo is that, should a failure occur during the undo, the simplest undo method faces extra undo work during a retry; it must resubmit the audit records that resulted from a previous undo pass to be undone themselves. In the worst case of multiple unsuccessful recovery attempts, the amount of extra work (extra audit to read and extra undo operations to perform) can double with each attempt.

A known method of avoiding the extra undo involves the use of back-chaining pointers which link together all audit records in a given transaction. When an audit record is processed for undo, the generated audit includes a pointer to the location of the previous audit record for the transaction. Successive undo recovery phases can use the pointers skip over both the "do" and the "undo" audit for all operations that were previously undone. The back-chaining mentioned above is done via what are referred to in the literature as "log sequence numbers" or "LSNs."

LSNs provide a mechanism by which a resource manager or recovery manager can compare the state of a database page with respect to a given audit record. In particular, the labelling of audit records and database pages with LSNs can be used to avoid certain page-oriented redo and undo operations when the change has already been applied to the database during normal processing or by some previous recovery process. LSNs are required to be monotonically increasing, unique values in order to fulfill this role.

FIGS. 6 and 7 depict how the use of pointers eliminates the requirement of extra undo during retry. In the figures, a box containing a simple numeral represents an audit record associated with an original update made by a transaction. For example, [1] represents the first such update in the series. A box containing a numeral and a "prime" symbol (e.g. [1']) represents the CLR generated by undoing the associated original update. A box containing a number and a "double-prime" symbol (e.g. [1"]) represents the undo of the CLR that was generated when the associated original update was undone.

FIG. 6 shows the set of audit records produced for a transaction that updates a given object 4 times, aborts, and is afflicted by repeated failures at the point where the recovery process attempts to undo operation [1].

When the transaction aborts, the initial recovery pass undoes operations [4], [3], and [2], writes the associated CLRs [4'], [3'], and [2'] to the log in forward chronological order, and then fails.

The next recovery attempt scans the audit trail backwards. The first audit record it finds is [2']. It performs undo operations using the CLRs generated by the first failed recovery attempt, and generating [2"], [3"], and [4"]. Continuing back in the log, it undoes the last original update ([4]) again. [3] and [2] are then undone, followed by the failure of the second recovery attempt.

The first audit record encountered by the third recovery attempt is the [2'] generated by the second attempt. The recovery process undoes [2'], [3'], [4'], creates CLRs [2"], [3"], [4"] as so on.

In many existing systems, LSNs are the addresses of audit records in the log and next undo LSNs are backward pointers containing a value which is the address of an audit record in the log. Published recovery methods routinely exploit the fact that LSNs contain log addresses, including their use in the ARIES method described in the above-referenced article to avoid undoing CLRs.

FIG. 7 depicts back-chaining when each CLR contains, in addition to a description of the compensating action, a pointer to that transaction's log record that precedes the one that the given CLR is compensating. Thus, if the recovery attempt fails after compensating [2] the next redo attempt reads the pointer in [2'] and go directly to [1], the next update that was not compensated by the previous recovery attempt.

Unfortunately, back-chaining LSNs in the form of addresses to entries in the log to avoid undoing CLRs is not adequate for systems which involve "distributed" creation of audit for a given transaction, destined for a single logical audit trail.

When multiple independent resource managers share transactions and a single log, it is not practical to back-chain the LSNs of all audit for a transaction. The resource managers generate their audit logs independently, and their audit logs are later merged with the audit logs of other resource managers in the single shared common log. In such a case, the construct used by the resource manager to fill the "page-state" role of an LSN cannot, for all practical purposes, be the address of an audit record in the log.

This is because the resource manager can't know what the log address of an audit record will be at the time a database update is performed and the audit record is created. In order to use a log address as the LSN, the resource manager would have to be capable of somehow fixing up all audit records and all modified database pages after it flushes a buffer of audit to the common log. This approach is contraindicated due to the severe performance penalties it implies, as well as the complication it adds to the "pagestate" mechanisms that depend on the LSN.

The use of back-chained LSNs as described in the Mohan article may also be less practical for transaction systems that copy audit records from their original log locations to some other location. Examples of this include dynamic logging and log-based data replication schemes.

SUMMARY OF THE INVENTION

The present invention is a method for providing recovery from a failure in a system utilizing distributed audit. The system lowers the amount of extra undo operations caused by failures occurring during the recovery process.

According to one aspect of the invention, each independent resource manager generates its own log in forward chronological order and each log record includes a monotonically increasing log sequence number and resource manager id. A common shared log is formed by merging the independent resource manager logs.

According to another aspect of the invention, during a recovery the log is scanned in reverse order, a count value is incremented each time a compensating action is performed, and a compensating log entry is written to the log in forward order. If the count value is equal to a preset value then a next undo record is written to the log in forward order that includes a record_id of a current log record being compensated.

If a next undo record is read during the backward scan then all records are ignored until the record having the record_id included in the next undo record is read. Thus, compensating log entries of records already undone occurring before the next undo record in the log are ignored and excessive undo operations are avoided.

Other aspects, features, and advantages of the invention will be apparent in view of the following detailed description and appended drawings.

BRIEF DESCRIPTION OF THE DRAWINGS

FIGS. 2 and 3 are schematic diagrams of recovery processes utilizing NextUndo records;

FIGS. 6 and 7 are schematic diagrams of prior art recovery processes utilizing back-chaining of LSNs.

DESCRIPTION OF THE PREFERRED EMBODIMENT

Figure 1:
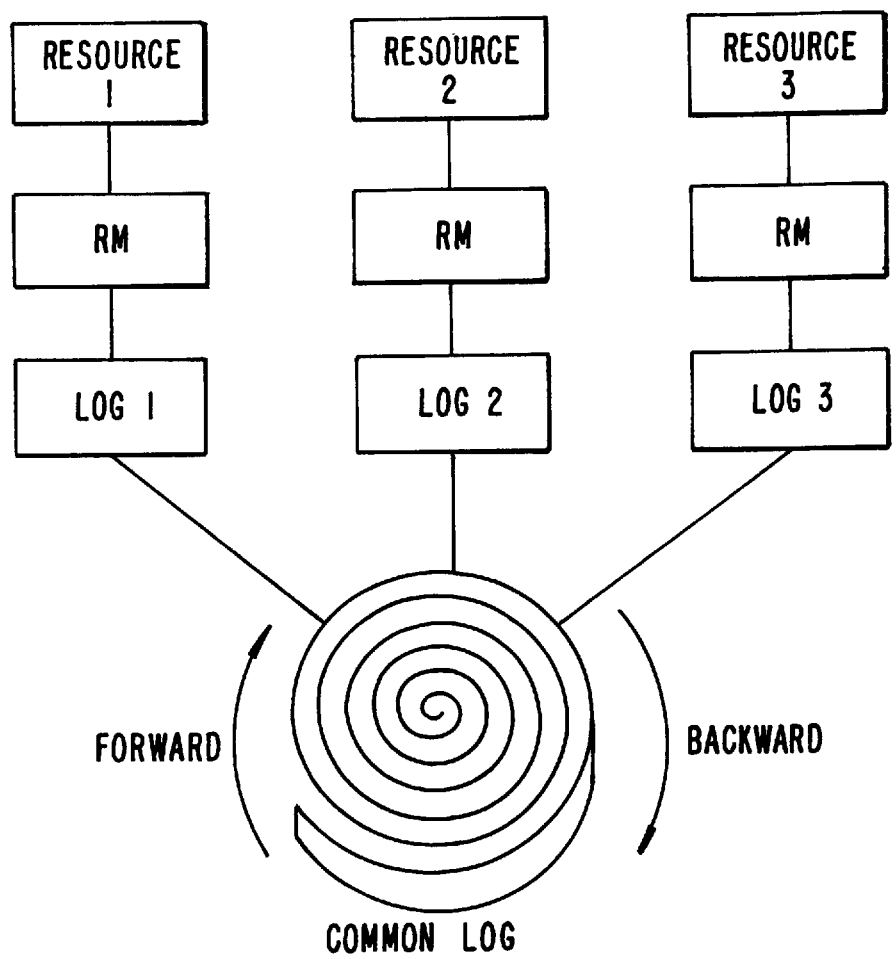
FIG. 1 is a block diagram of a processing system that generates a distributed audit trail.

FIG. 1 depicts a system including multiple resources and resource managers which share transactions and a common log that involve "distributed" creation of audit for a single transaction. The common log may be written on a disc and is formed by merging logs generated at each of the resource managers. For the purpose of describing the invention, the convention that the data is written on the disk in forward order and read from the disk backward or in reverse order is used.

Each resource manager, when creating its log, identifies each audit record with a monotonically increasing record_id. In the preferred embodiment this tag incudes a Volume Sequence Number (VSN), which is a 48-bit increasing integer, and an resource manager ID which identifies the resource manager creating the audit record. These record_ids perform the "page state" function during a recovery operation.

The recovery system of the present invention utilizes these record_ids to limit the number of undo's that must be redone if a failure occurs during recovery. In this method, the recovery manager creates a next undo record in the audit every so often that will be used on any successive recovery attempts to skip a number of undo operations that were previously completed.

After performing N, where N is a predetermined integer, undo operations for a given transaction against a given resource manager or object, the recovery process causes an next undo record to be written to the log. This next undo record is inserted just before the recovery manager attempts to perform the N+1st undo operation. This record, called a NextUndoVSN record in a preferred embodiment, includes the unique record_id of the audit record associated with the undo operation the recovery process is about to attempt.

The NextUndoVSN record must be recorded in the log only if the previous N undo operations are guaranteed to be made permanent. In a typical system using write-ahead logging and physical redo during resource manager restart, it is sufficient that the CLRs associated with the N undo operations are in the log on stable storage before the NextUndoVSN record is added to the log.

If a recovery attempt fails during an undo phase, a successive recovery attempt will read the NextUndoVSN record during its undo phase. It will then remember to ignore all audit records for the specified (object X transaction) pair until it reaches the record identified (pointed to) by the NextUndoVSN record.

Note that if N=0, the result is that a NextUndoVSN is generated before every undo operation, and CLRs are never undone. However, a preferred embodiment uses N=10. After every 10 undo operations, a NextUndoVSN record is inserted that prevents the recovery process from seeing and undoing 20 logical undo operations if a failure forces a retry (10 records that the recovery process read and performed undo for, plus the 10 CLRs associated with them). Using this value of N also lowers the cost of this method: it lowers the amount of audit space consumed by NextUndoVSN records, and it lowers the amount of cpu resources consumed in their creation.

Also, if the resource manager is delayed before generating the pointer record, a larger value of N will help reduce the performance penalty this method imposes on the recovery process.

FIGS. 2 and 3 illustrate the NextUndoVSN audit records generated by this method and their relationship to the original audit and CLRs of example transactions. For purposes of exposition, only the audit associated with a single (object X transaction) is shown.

In the figures, a box containing a simple numeral represents an audit record associated with an original update made by a transaction. For example, [1] represents the first such update in the series. A box containing a numeral and a "prime" symbol (e.g. [1']) represents the CLR generated by undoing the associated original update. A box containing a number and a "double-prime" symbol (e.g. [1"]) represents the undo of the CLR that was generated when the associated original update was undone. A box containing "NU" represents a NextUndoVSN record, and the associated arrow indicates the audit record whose unique record_id is stored therein.

The audit records (boxes) in the figures are grouped so that original updates appear together and are separated from groups of audit produced by undo processing. The second set of audit records represents the audit from the first undo pass, the third group represents the audit from the second undo pass, and so on. Note that, during a recovery existing audit records in the log are scanned backwards (to the left in the figures) and the created CLRs are written to the log in the forward direction (to the right in the figures).

FIG. 2 illustrates the set of audit records produced for a transaction that updates a given object 6 times, aborts, and is successfully undone. The number of undo operations (N) performed before each NextUndoVSN record is generated is 2 in this case.

When the transaction aborts, the recovery process scans the log backwards. The first audit record it encounters is [6]. [6] and [5] are undone, resulting in the creation of the associated CLRs. Since N is 2, before performing the third undo (of [4]), the recovery process creates a NextUndoVSN record containing the unique record_id of [4], and resets its count of undoes performed to zero. It then proceeds to undo [4] and [3], insert another NextUndoVSN record referencing [2], and finally undoes [2] and [1].

Note that if, for example, the recovery process had failed after undoing [4], the NextUndoVSN record that follows [5'] would let the next recovery attempt know that it could skip both the "do" and the "undo" of original operations [5] and [6].

FIG. 3 shows the set of audit records produced for a transaction that updates a given object 4 times, aborts, and is afflicted by repeated failures at the point where the recovery process attempts to undo operation [1]. In this illustration, the number of undo operations (N) performed before each NextUndoVSN record is generated is 4.

When the transaction aborts, the initial recovery pass undoes operations [4], [3], and [2]. It then fails, after generating the associated CLRs but no NextUndoVSN records.

The next recovery attempt scans the audit trail backwards. The first audit record it finds is [2']. It performs undo operations using the CLRs generated by the first failed recovery attempt, and generating [2"], [3"], and [4"]. Continuing back in the log, it undoes the last original update ([4]) again. Before undoing [3], a NextUndoVSN record is created which includes the record_id of the next operation to be undone, i.e., [3], since N is 4 and the recovery process is about to perform the fifth undo operation. [3] and [2] are then undone, followed by the failure of the second recovery attempt.

The first audit record encountered by the third recovery attempt is the [2'] generated by the second attempt. The recovery process undoes [2'] and [3']. It then discovers the NextUndoVSN record created during the second recovery attempt. The recovery process records the unique record_id included therein, which references the original operation [3]. As the recovery process continues to read back through the log, it ignores the audit records for the given object and transaction until it encounters the referenced operation. The recovery process then proceeds to undo [3] and [2]. Since it has now performed N (4) undo operations, it will create a NextUndoVSN record referencing [1] prior to attempting to undo [1].

Any future recovery attempts will now skip all the "do" and "undo" audit associated with the original operations [2], [3], and [4]. The first record for which undo would be attempted is [1].

FIG. 3 illustrates how this method limits the growth of the extra work even when a NextUndoVSN record is generated somewhat less frequently than failures occur. Although there can be pathological cases where the method does not converge to a state where no extra work is done, it does limit the number of extra undo operations that a given undo attempt generates for the next recovery attempt to N or fewer. This is far superior to the unchecked exponential growth that can occur in the absence of an undo-skipping method.

Figure 4:
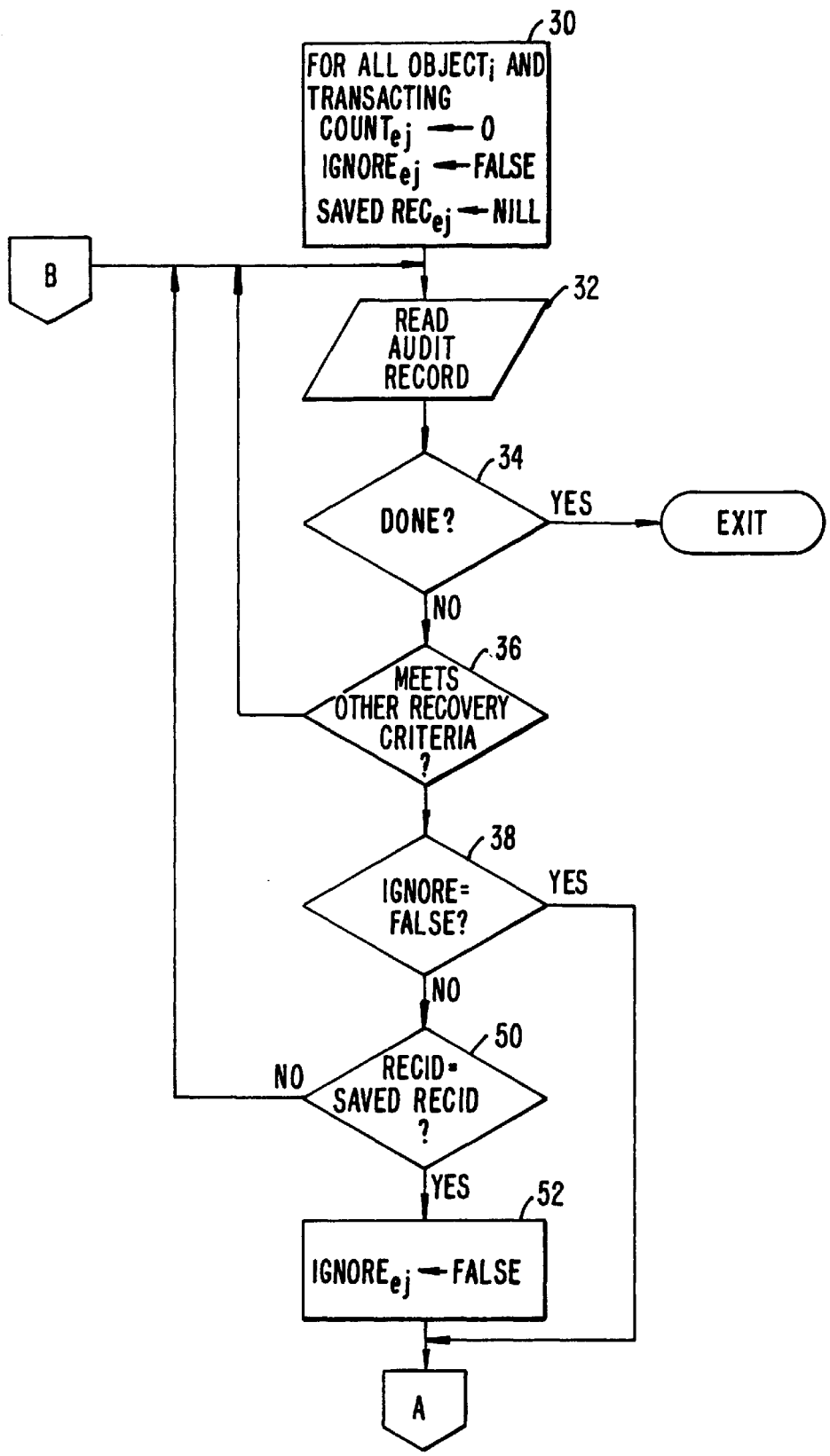
FIGS. 4 and 5 are flow charts illustrating the operation of a preferred embodiment.
Figure 5:
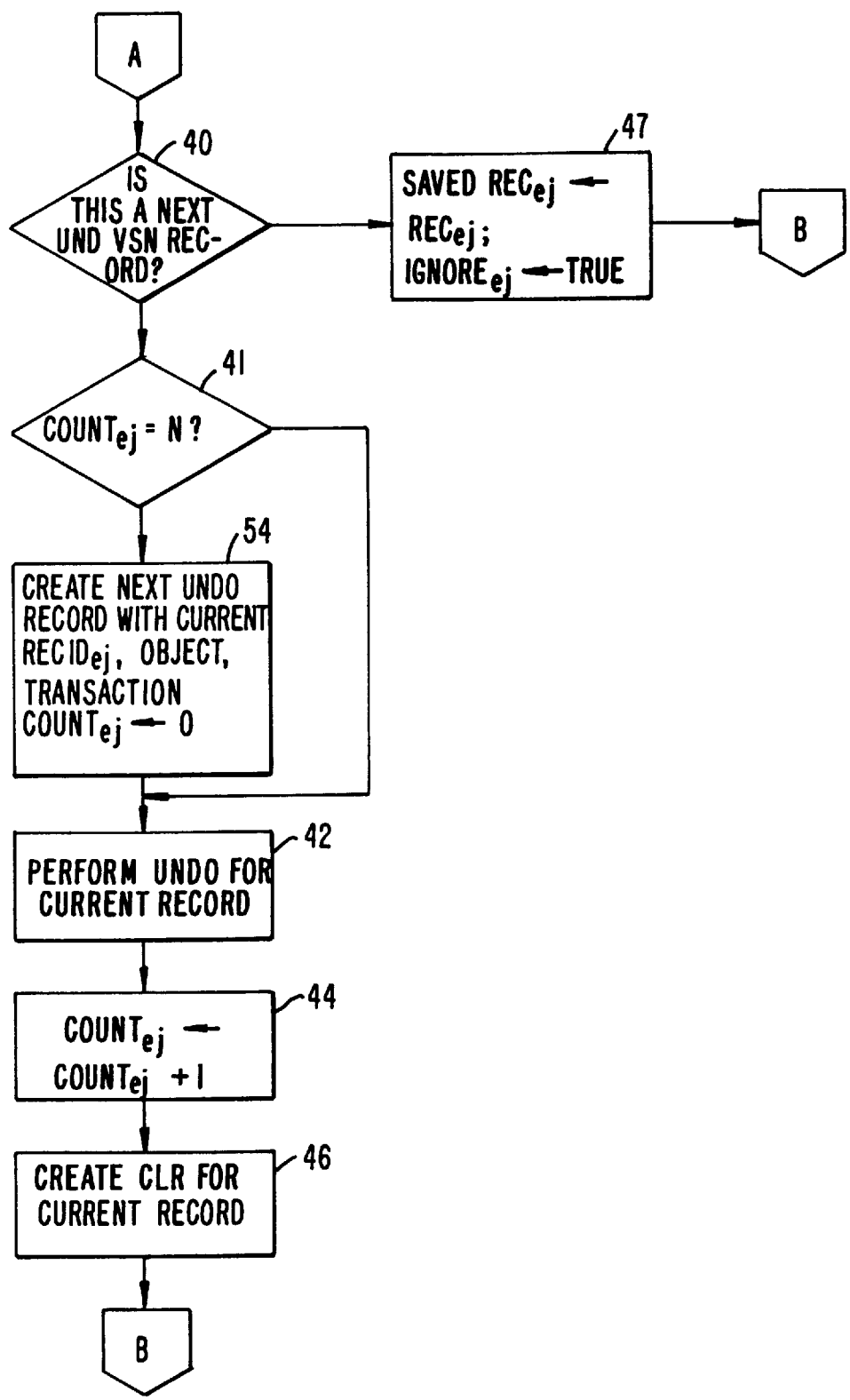

FIGS. 4 and 5 are high-level flow charts illustrating how the above-described method is incorporated into the undo mechanism of the recovery process. When recovering from a failure, the parameters count, ignore, and saved_recid are initialized 30 to 0, false, and nil respectively. The log is then scanned backward and an audit record is read 32 from the log and becomes the current audit record. The current audit record is checked 34 to see if the recovery process is done 34, checked 36 to see if other recovery criteria are met 36, and the ignore value it tested 38.

In the case where ignore is false, the current audit record is checked 40 to see if the current audit record is a NextUndo record and, if not, the count value is tested 41 to determine whether count=N. In the case where count is not equal to N, the undo 42 of the operation described in the current audit record is performed, the count value is incremented 44, and a CLR for the current audit record is written 46 to the log. The recovery process then reads 32 a new audit record from the log which becomes the current audit record.

Returning back to the step of checking 40 whether the current record is a NextUndo record, if it is, then the saved record parameter is given 47 the value of the unique record_id included in the NextUndo record and the ignore parameter is given a true value. The next record is then read 32 from the log and the it is determined that the ignore value is true when it is tested 38.

The value of the record_id of the current audit record is compared 50 to the value of saved_recid. If the values are not equal then the next audit record is read 32 from the log and processed a current audit record. On the other hand, if the value of the record_id of the current record is equal to the value of the saved_recid then the value of the ignore parameter is changed 52 to false and processing of the current audit record is continues.

Thus, all audit records in the log are ignored until the audit record having a record id value equal to the saved_recid value is read from the log. The undoing of the operations described in the log are then continued from that point.

Referring back to the step of checking 40 whether the count value is equal to N, if value of the count parameter is equal to N then a NextUndo record is created 54 including the unique record_id of the current audit record and the count value is reset to zero. The processing of the current record is then continued.

Thus, a NextUndo record is created after the process reads N audit records from the log.

As stated above, the present method can be used to reduce undo processing when the use of back-chained LSNs is impossible, difficult, and/or any or all of the following conditions exist:

(a) It is impossible or undesirable to modify the redo/undo methods of the involved resource manager(s), and/or the format of the audit records they produce, but the recovery manager logic may be modified.

(b) It is impossible or undesirable to modify the format of the CLRs by the involved resource manager(s), and those CLRs do not already contain, or allow for the inclusion of, a pointer to the audit record that precedes that of the undone operation.

The invention has now been described with reference to the preferred embodiments. Alternatives and substitutions will now be apparent to persons of skill in the art.

What is claimed is:

1. In a data processing system including a plurality of independent resource managers which share transactions and a common log, with a transaction including one or a plurality of delimited actions, a process, performed by a recovery manager, for processing audit records in the common log to perform recovery from a fault, said process comprising the steps of:

generating, at each independent resource manager, an audit log including audit records, written to the audit log in forward chronological order, for each action performed, with each audit record including a record_id comprising a monotonically increasing sequence number (SN) generated by the resource manager in forward chronological order and a resource manager id;

merging the audit records from each independent resource manager into the common log;

in the event of failure, performing a recovery process performed by a recovery manager, including the steps of initializing a count value and a saved_recid value, setting an ignore value to false, and scanning backward the audit records of an aborted transaction from the common log, and writing to the common log, in forward order, compensating log entries corresponding to each audit record scanned in reverse order, and for a current audit record scanned from the log:

(a) if the current audit record is not a next undo record, the count value is less than a predetermined integer value (N), and the ignore value is false:

performing a compensating action for the action described in the current audit record;

generating a compensating log record for the compensating action including a record_id comprising a monotonically increasing sequence number generated by the recovery processor in forward order and data describing the compensating action;

writing the compensating log record to the common log in forward order;

incrementing the count value; and reading the next audit record from the log in reverse order and processing the next audit record as a current audit record;

(b) if the current audit record is not a next undo record, the count value is equal to N, and the ignore value is false:

generating a next undo record, including a record_id comprising a monotonically increasing sequence number generated by the recovery processor in forward order and a next undo record_id equal to the record_id of the current audit record;

writing the next undo record to the log in forward order;

initializing the count value;

performing a compensating action for the action described in the current audit record;

generating a compensating log record for the compensating action including a record_id comprising a monotonically increasing sequence number generated by the recovery processor in forward order and data describing the compensating action;

writing the compensating log record to the common log in forward order;

incrementing the count value; and reading the next audit record from the log in reverse order and processing the next audit record as a current audit record;

(c) if the current audit record is a next undo record:

giving the value of the next undo record id included in the next undo record as the saved_recid value;

changing the ignore value to true; and reading a second audit record, preceding the current audit record, from the common log in reverse order; and (i) if the record_id of the second audit record is not equal to the saved_recid:

not performing an action compensating for the action described in the second audit record; and reading a third audit record, preceding the second audit record, from the common log in reverse order; and processing the third audit record as a current audit record; or (ii) if the record_id of the second audit record is equal to the saved_recid:

changing the ignore value to false; and processing the second audit record as a current audit record.

* * * * *